United States Patent
Kim et al.

(10) Patent No.: US 9,685,994 B2
(45) Date of Patent: Jun. 20, 2017

(54) ANTENNA FOR WIRELESS POWER TRANSMISSION AND NEAR FIELD COMMUNICATION

(71) Applicants: Samsung Electronics Co., Ltd., Suwon-si (KR); Korea Advanced Institute of Science and Technology, Daejeon (KR)

(72) Inventors: Dong Zo Kim, Yongin-si (KR); Sang Wook Kwon, Seongnam-si (KR); Ki Young Kim, Yongin-si (KR); Nam Yun Kim, Seoul (KR); Yun Kwon Park, Dongducheon-si (KR); Jae Hyun Park, Yongin-si (KR); Keum Su Song, Seoul (KR); Chi Hyung Ahn, Suwon-si (KR); Young Ho Ryu, Yongin-si (KR); Jong Won Yu, Daejeon (KR); Chang Wook Yoon, Seoul (KR); Wang Sang Lee, Daejeon (KR)

(73) Assignees: Samsung Electronics Co., Ltd., Suwon-si (KR); Korea Advanced Institute Of Science and Technology, Daejeon (KR)

( * ) Notice: Subject to any disclaimer, the term of this patent is extended or adjusted under 35 U.S.C. 154(b) by 602 days.

(21) Appl. No.: 14/096,915

(22) Filed: Dec. 4, 2013

(65) Prior Publication Data
US 2014/0152516 A1 Jun. 5, 2014

(30) Foreign Application Priority Data

Dec. 4, 2012 (KR) .................. 10-2012-0139819
Jan. 22, 2013 (KR) .................. 10-2013-0007129

(51) Int. Cl.
*H01Q 1/00* (2006.01)
*H04B 5/00* (2006.01)
(Continued)

(52) U.S. Cl.
CPC ........... *H04B 5/0037* (2013.01); *H01Q 1/521* (2013.01); *H01Q 5/40* (2015.01); *H01Q 7/00* (2013.01); *H01Q 21/28* (2013.01); *H04B 5/0031* (2013.01)

(58) Field of Classification Search
CPC ......................................... H01Q 1/00
(Continued)

(56) References Cited

U.S. PATENT DOCUMENTS 4,972,198 A * 11/1990 Feltz .................. H01Q 7/04
340/572.7
5,557,293 A * 9/1996 McCoy .................. H01Q 1/243
343/867
(Continued)

FOREIGN PATENT DOCUMENTS

JP 2009-288874 A * 12/2009 ............. G06K 19/02
JP 2010-200207 A 9/2010
(Continued)

OTHER PUBLICATIONS

International Search Report issued on Mar. 14, 2014, in counterpart International Application No. PCT/KR2013/011174 (3 pages in English).

*Primary Examiner* — Huedung Mancuso
(74) *Attorney, Agent, or Firm* — NSIP Law (57) ABSTRACT

A dual antenna for wireless communication transmission (WPT) and near field communication (NFC) includes a loop antenna, and a dual loop antenna disposed at an inside and an outside of the loop antenna.

17 Claims, 8 Drawing Sheets

(51) Int. Cl.
  *H01Q 1/52* (2006.01)
  *H01Q 7/00* (2006.01)
  *H01Q 21/28* (2006.01)
  *H01Q 5/40* (2015.01)

(58) Field of Classification Search
  USPC .............................. 343/720, 867, 895, 702
  See application file for complete search history.

(56) References Cited

U.S. PATENT DOCUMENTS

| | | | | |
|---|---|---|---|---|
| 8,922,162 | B2* | 12/2014 | Park | H02J 7/00 320/108 |
| 9,083,073 | B2* | 7/2015 | Yang | H01Q 1/22 |
| 2002/0121991 | A1* | 9/2002 | Rostren | B61L 25/026 340/988 |
| 2003/0096637 | A1* | 5/2003 | Keller, III | H01Q 1/243 455/562.1 |
| 2005/0186902 | A1* | 8/2005 | Lieffort | G06K 7/10178 455/41.1 |
| 2010/0190436 | A1 | 7/2010 | Cook et al. | |
| 2010/0214177 | A1 | 8/2010 | Parsche | |
| 2011/0063180 | A1 | 3/2011 | Su | |
| 2011/0065383 | A1* | 3/2011 | Frankland | H01Q 1/243 455/41.1 |
| 2012/0194404 | A1* | 8/2012 | Arkko | H01Q 1/243 343/867 |
| 2012/0249396 | A1* | 10/2012 | Parsche | H01Q 1/243 343/866 |
| 2012/0293006 | A1* | 11/2012 | Kim | H04B 5/0031 307/104 |
| 2013/0252676 | A1* | 9/2013 | Lee | H04B 5/0037 455/573 |
| 2014/0139389 | A1* | 5/2014 | Odorcic | H01Q 9/28 343/834 |
| 2014/0197832 | A1* | 7/2014 | Driesel | H01Q 7/005 324/307 |
| 2015/0009088 | A1* | 1/2015 | Lavedas | H01Q 21/28 343/867 |
| 2015/0171519 | A1* | 6/2015 | Han | H04B 5/0037 343/720 |
| 2015/0318711 | A1* | 11/2015 | Moon | H01Q 1/38 307/104 |

FOREIGN PATENT DOCUMENTS

| | | |
|---|---|---|
| JP | 2012-019302 A | 1/2012 |
| KR | 10-0646745 B1 | 11/2006 |
| KR | 10-0769540 B1 | 10/2007 |
| KR | 10-0801262 B1 | 2/2008 |
| KR | 10-2008-0074640 A | 8/2008 |
| KR | 10-2011-0103395 A | 9/2011 |
| KR | 10-2011-0115602 A | 10/2011 |
| WO | WO 2010/093965 A2 | 8/2010 |

* cited by examiner

ANTENNA FOR WIRELESS POWER TRANSMISSION AND NEAR FIELD COMMUNICATION

CROSS-REFERENCE TO RELATED APPLICATIONS

This application claims the benefit under 35 USC 119(a) of Korean Patent Application Nos. 10-2012-0139819 filed on Dec. 4, 2012, and 10-2013-0007129 filed on Jan. 22, 2013, in the Korean Intellectual Property Office, the entire disclosures of which are incorporated herein by reference for all purposes.

BACKGROUND

1. Field

The following description relates to an antenna for wireless power transmission and near field communication.

2. Description of Related Art

To provide a wireless communication transmission (WPT) function and a near field communication (NFC) function in a terminal, a coupling device may be used. Use of the coupling device may enable a single antenna in the terminal to be shared for the WPT function and the NFC function. The coupling device may include a coupler, a radio frequency (RF) switch, and/or a diplexer.

When the terminal employs the coupling device, an efficiency of the WPT function may be reduced due to an insertion loss generated by the coupling device. In addition, simultaneous use of the WPT function and the NFC function may be impracticable. To satisfy both the WPT function and the NFC function to be performed by the single antenna, a Q value of the single antenna may need to be controlled. Also, a WPT system and an NFC system may need to be separated from each other.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a dual antenna includes a loop antenna; and a dual loop antenna disposed at an inside and an outside of the loop antenna.

The dual loop antenna may include an inner portion disposed at the inside of the loop antenna; a first outer portion disposed at the outside of the loop antenna; a second outer portion disposed at the outside of the loop antenna; a first connecting portion connecting a first end of the inner portion to an end of the first outer portion; and a second connecting portion connecting a second end of the inner portion to an end of the second outer portion.

The first connecting portion may overlap the loop antenna disposed on a plane; and the second connecting portion overlaps the loop antenna.

The loop antenna may be configured to perform wireless power transmission; and the dual loop antenna may be configured to perform near field communication.

The loop antenna may be configured to generate a first field; and the dual loop antenna may be configured to generate a second field offsetting the first field.

The loop antenna and the dual loop antenna may be configured so that an induced current generated in the dual loop antenna by a field generated by the loop antenna is less than or equal to a predetermined value.

In another general aspect, a dual antenna includes a first antenna including a circle or polygon shape that is partially cut; and a second antenna disposed at an inside and an outside of the first antenna.

The second antenna may include an inner portion disposed at the inside of the first antenna; a first outer portion disposed at the outside of the first antenna; a second outer portion disposed at the outside of the first antenna; a first connecting portion connecting a first end of the inner portion to an end of the first outer portion; and a second connecting portion connecting a second end of the inner portion to an end of the second outer portion.

The first connecting portion may overlap the first antenna disposed on a plane; and the second connecting portion may overlap the first antenna.

The first connecting portion and the first antenna may be insulated from each other; and the second connecting portion and the first antenna may be insulated from each other.

The first antenna and the second antenna are disposed on a plane.

The second antenna may include a dual loop antenna.

The first antenna is configured to perform wireless power transmission using a first frequency; and the second antenna is configured to perform near field communication using a second frequency.

The first antenna may have a high Q value; and the second antenna may have a low Q value.

The first antenna may be configured to generate a first field; and the second antenna is configured to generate a second field offsetting the first field.

The first antenna and the second antenna may be configured so that an induced current generated in the second antenna by a field generated by the first antenna is less than or equal to a predetermined value.

In another general aspect, a dual antenna includes a first antenna configured to generate a first field; and a second antenna configured to generate a second field offsetting the first field.

The first antenna may be configured to perform wireless power transmission; and the second antenna may be configured to perform near field communication.

Other features and aspects will be apparent from the following detailed description, the drawings, and the claims.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. Also, descriptions of functions and constructions that are well known to one of ordinary skill in the art may be omitted for increased clarity and conciseness.

Throughout the drawings and the detailed description, the same reference numerals refer to the same elements. The drawings may not be to scale, and the relative size, proportions, and depiction of elements in the drawings may be exaggerated for clarity, illustration, and convenience.

Figure 1:
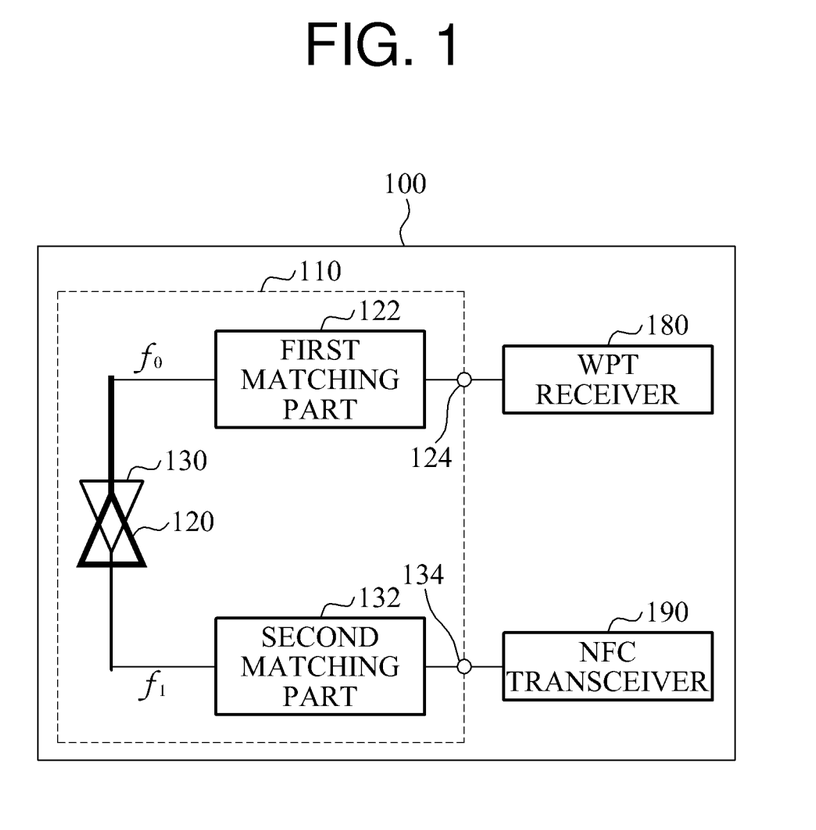
FIG. 1 is a diagram illustrating an example of a terminal.

FIG. 1 is a diagram illustrating an example of a terminal 100. The terminal 100 includes a dual antenna 110, a wireless power transmission (WPT) receiver 180, and a near field communication (NFC) transceiver 190.

The dual antenna 110 may be a high-isolation dual antenna. The dual antenna 110 includes a first antenna 120, a first matching part 122, a first connector 124, a second antenna 130, a second matching part 132, and a second connector 134.

The first antenna 120 is configured for WPT. The first antenna 120 may have a high Q value for the WPT. The first antenna 120 may receive a signal having a frequency $f_0$. The WPT receiver 180 may use the frequency $f_0$. For example, $f_0$ may be about 13.56 MHz.

The second antenna 130 is configured for NFC. The second antenna 130 may have a low Q value for the NFC. The second antenna 130 may receive a signal having a frequency $f_1$. The NFC transceiver 190 may use the frequency $f_1$. For example, $f_1$ may be about 6.78 MHz.

The high Q value of the first antenna 120 may be about 100 or more. The high Q value may be within a range of Q values needed for high efficiency WPT. The low Q value of the second antenna 130 may be about 40 or less. The low Q value may be within a range of Q values needed for a high data transmission rate in NFC.

The high Q value and the low Q value may be relative concepts. For example, when the first antenna 120 has the high Q value, this may mean the Q value of the first antenna 120 is higher than the Q value of the second antenna 130. When the second antenna 130 has the low Q value, this may mean the Q value of the second antenna 130 is lower than the Q value of the first antenna 120.

The first antenna 120 and the second antenna 130 may be separated from each other physically and/or electrically. The first antenna 120 and the second antenna 130 may be adjacent to each other. In this example, nevertheless, the first antenna 120 and the second antenna 130 may have high isolation characteristics with respect to each other. In more detail, the first antenna 120 may have high isolation characteristics with respect to the second antenna 130. For example, an electromagnetic field generated from the second antenna 130 may have almost no influence or low influence on the first antenna 120. The second antenna 130 may have high isolation characteristics with respect to the first antenna 120. For example, an electromagnetic field generated from the first antenna 120 may have almost no influence or low influence on the second antenna 130.

The first connector 124 connects the first antenna 120 and the WPT receiver 180 to each other. The first connector 124 transmits, to the WPT receiver 180, the signal received through the first antenna 120. The second connector 134 connects the second antenna 130 and the NFC transceiver 190 to each other. The second connector 134 transmits, to the NFC transceiver 190, the signal received through the second antenna 130. Also, the second connector 134 transmits, to the second antenna 130, a signal received from the NFC transceiver 190.

The first matching part 122 is an impedance matching part. The first matching part 122 performs impedance matching between the first antenna 120 and the WPT receiver 180. The first matching part 122 may perform the impedance matching between an output impedance of the first antenna 120 and an input impedance of the WPT receiver 180. According to characteristics of the first antenna 120, the first matching part 122 may include capacitors connected in series or parallel.

The second matching part 132 is an impedance matching part. The second matching part 132 performs impedance matching between the second antenna 130 and the NFC transceiver 190. The second matching part 132 may perform the impedance matching between an output impedance of the second antenna 130 and an input impedance of the NFC transceiver 190. To obtain proper Q values of the second antenna 130, the second matching part 132 may include passive devices. The passive devices may include a resistor, capacitor, and an inductor.

Figure 2:
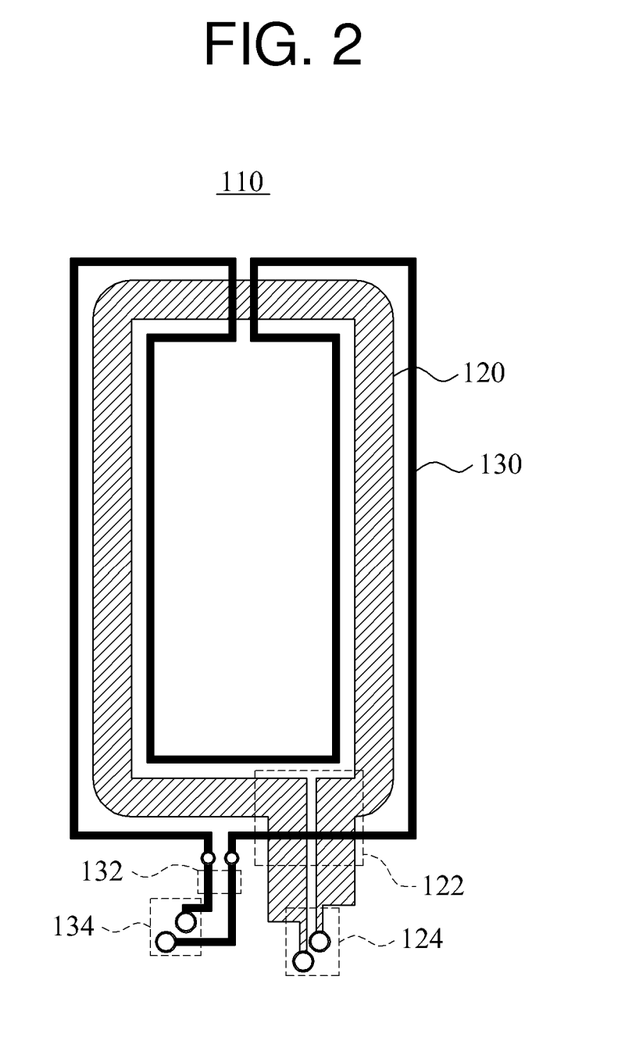
FIG. 2 is a diagram illustrating an example of a dual antenna of FIG. 1.

FIG. 2 is a diagram illustrating an example of the dual antenna 110 of FIG. 1. In FIG. 2, the first antenna 120, the second antenna 130, the first matching part 122, the second matching part 132, the first connector 124, and the second connector 134 that are described with reference to FIG. 1 are shown.

The first antenna 120 is a single loop antenna. The second antenna 130 is a dual loop antenna. The second antenna 130 is disposed at an inside and an outside of the first antenna 120. In more detail, the second antenna 130 encompasses the first antenna 120. That is, a portion of the second antenna 130 is disposed at an outside of a region in which the first antenna 120 is disposed, and another portion of the second antenna 130 is disposed at an inside of the region in which the first antenna 120 is disposed. The configuration of the second antenna 130 will be described in more detail with reference to FIG. 3.

The first antenna 120 is for WPT. To achieve a high Q value, the first antenna 120 is the single loop antenna having a large linewidth. The second antenna 130 is for NFC. To achieve a low Q value, the second antenna 130 is the dual loop antenna having a small linewidth.

Due to the dual loop antenna configuration, the second antenna 130 may have high isolation characteristics with respect to the first antenna 120. The first antenna 120 and the second antenna 130 may have high isolation characteristics with respect to each other. The high isolation characteristics may be expressed as a decibel (dB) value at a frequency, such as a frequency $f_0$ or a frequency $f_1$. The high isolation characteristics may have different dB values with respect to the WPT and the NFC. For example, the high isolation characteristics in the WPT may be about 20 dB at the frequency $f_0$ of about 13.56 MHz. The high isolation characteristics in the NFC may be about 25 dB at the frequency $f_1$ of about 6.78 MHz.

The first antenna 120 may have a circular shape or a polygonal shape. The first antenna 120 may have a shape of a partially cut circle or a partially cut polygon, rather than a complete circle or polygon. In the example of FIG. 2, the first antenna 120 has a rectangular shape with rounded corners. A lower end of the first antenna 120 is partially cut.

Two end points of the first antenna 120 are connected to the first matching part 122 and the first connector 124. The two end points of the first antenna 120 may be input feeding units of the first antenna 120. Two end points of the second antenna 130 are connected to the second matching part 132 and the second connector 134. The two end points of the second antenna 130 may be input feeding units of the second antenna 130.

The first antenna 120 and the second antenna 130 may be disposed on a plane. For example, the plane may not be a completely 2-dimensional (2D) plane, but may be a curved plane, a bent plane, and/or a stepped plane having different heights. Also, the first antenna 120 and the second antenna 130 may be provided on a printed circuit board (PCB), and may be provided on a case or a battery cover of a mobile phone.

A portion of the second antenna 130 passes over or under (i.e., overlaps or is overlapped by) the first antenna 120 disposed on the plane. The portion of the second antenna 130 may pass under a portion of the first antenna 120 disposed on the plane, i.e., may be overlapped by a portion of the first antenna 120 disposed on the plane. Alternatively, the portion of the second antenna 130 may pass over a portion of the first antenna 120 disposed on the plane, i.e., may overlap a portion of the first antenna 120 disposed on the plane. If the portion of the second antenna 130 passes over or under the first antenna 120 disposed on the plane, an overlapping or overlapped portion of the first antenna 120 and an overlapped or overlapping portion of the second antenna 130 may be separated from each other physically and/or electrically. More than one portion of the second antenna 130 may pass over or under the first antenna 130, i.e., may overlap or be overlapped by the first antenna 120. For example, in FIG. 2, three portions of the second antenna 130 pass over, i.e., overlap, the first antenna 120. However, one or more portions of the second antenna 130 may pass over, i.e., overlap, the first antenna 120, while one or more other portions of the second antenna 130 may pass under, i.e., be overlapped by, the first antenna 120.

For example, at the overlapped portion of the first antenna 120 and the overlapping portion of the second antenna 130, an empty space or an insulating material may be disposed between the overlapped portion of the first antenna 120 and the overlapping portion of the second antenna 130. The overlapped portion of the first antenna 120 and the overlapping portion of the second antenna 130 may be separated from each other physically and/or electrically by the empty space or the insulating material.

The first antenna 120 and the second antenna 130 may be disposed on different planes, respectively. In the terminal 100, the plane on which the first antenna 120 is disposed and the plane on which the second antenna 130 is disposed may be adjacent to each other.

When the WPT is performed through the configuration of the dual antenna 110, a coupling device may not be separately used in the dual antenna 110. For example, since two ports of the dual antenna 110 are provided, a coupling device functioning as a switch may be unnecessary. Since an insertion loss is not generated by a coupling device, a reduction in an efficiency of the WPT may be prevented.

The second antenna 130 may be disposed around the first antenna 120. Although the dual antenna 110 includes two antennas, an area occupied by the dual antenna 110 may not be much greater than an area occupied by a single antenna.

The first antenna 120 and the second antenna 130 may have different Q values relative to each other. For example, when the first antenna 120 has a high Q value while the second antenna 130 has a low Q value, the WPT may be performed with a high efficiency, and data communication of the NFC may be performed with a high data transmission rate. Thus, by having different characteristics, the first antenna 120 and the second antenna 130 may be adjacent to each other without influencing each other.

By the configuration of the dual antenna 110, the WPT and the NFC may be simultaneously achieved through heterogeneous frequencies, e.g., the frequencies $f_0$ and $f_1$. For example, during wireless transmission of power to the terminal 100 using the WPT, the terminal 100 may perform data communication using the NFC.

Figure 3:
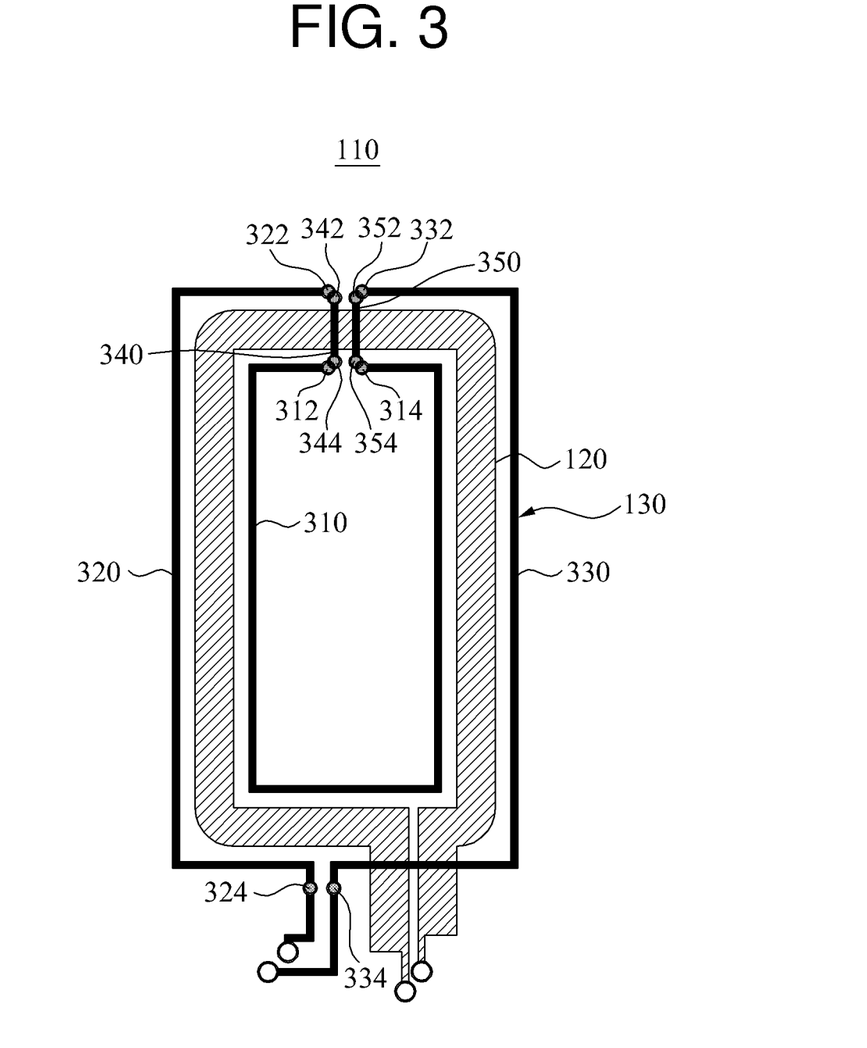
FIG. 3 is a diagram illustrating the example of the dual antenna of FIG. 2 in more detail.

FIG. 3 is a diagram illustrating the example of the dual antenna 110 of FIG. 2 in more detail. With reference to FIG. 3, a configuration of the second antenna 130 of FIG. 2 will be described in more detail. The second antenna 130 includes an inner portion 310, a first outer portion 320, a second outer portion 330, a first connecting portion 340, and a second connecting portion 350.

The inner portion 310 is disposed at an inside of the first antenna 120. That is, the inner portion 310 is disposed in a region formed at the inside of the first antenna 120.

The first outer portion 320 and the second outer portion 330 are disposed at an outside of the first antenna 120. That is, the first outer portion 320 and the second outer portion 330 are disposed in a region formed at the outside of the first antenna 120.

The first connecting portion 340 connects a first end 312 of the inner portion 310 to a first end 322 of the first outer portion 320. In more detail, a first end 342 of the first connecting portion 340 is connected to the first end 322 of the first outer portion 320. A second end 344 of the first connecting portion 340 is connected to the first end 312 of the inner portion 310.

The second connecting portion 350 connects a second end 314 of the inner portion 310 to a first end 332 of the second outer portion 330. In more detail, a first end 352 of the second connecting portion 350 is connected to the first end 332 of the second outer portion 330. A second end 354 of the second connecting portion 350 is connected to the second end 314 of the inner portion 310.

The first connecting portion 340 overlaps the first antenna 120 disposed on a plane. At an overlapped portion of the first antenna 120, the first connecting portion 340 and the first antenna 120 may be separated from each other physically and/or electrically. The second connecting portion 350 overlaps the first antenna 120 disposed on the plane. At another overlapped portion of the first antenna 120, the second connecting portion 350 and the first antenna 120 may be separated from each other physically and/or electrically.

For example, at the overlapped portion of the first antenna 120 that is overlapped by the first connecting portion 340, an empty space or an insulating material may be disposed between the first connecting portion 340 and the overlapped portion of the first antenna 120. That is, the first connecting portion 340 and the overlapped portion of the first antenna 120 may be separated from each other physically and/or electrically by the empty space or the insulating material.

For example, at the overlapped portion of the first antenna 120 that is overlapped by the second connecting portion 350, an empty space or an insulating material may be disposed between the second connecting portion 350 and the overlapped portion of the first antenna 120. That is, the second connecting portion 350 and the overlapped portion of the first antenna 120 may be separated from each other physically and/or electrically by the empty space or the insulating material.

As described above, isolation between the first antenna 120 and the second antenna 130 may be solved structurally. Accordingly, suitable isolation characteristics may be obtained.

A second end 324 of the first outer portion 320 and a second end 334 of the second outer portion 330 may be connected to a second matching part, e.g., the second matching part 132 of FIG. 2.

Figure 4:
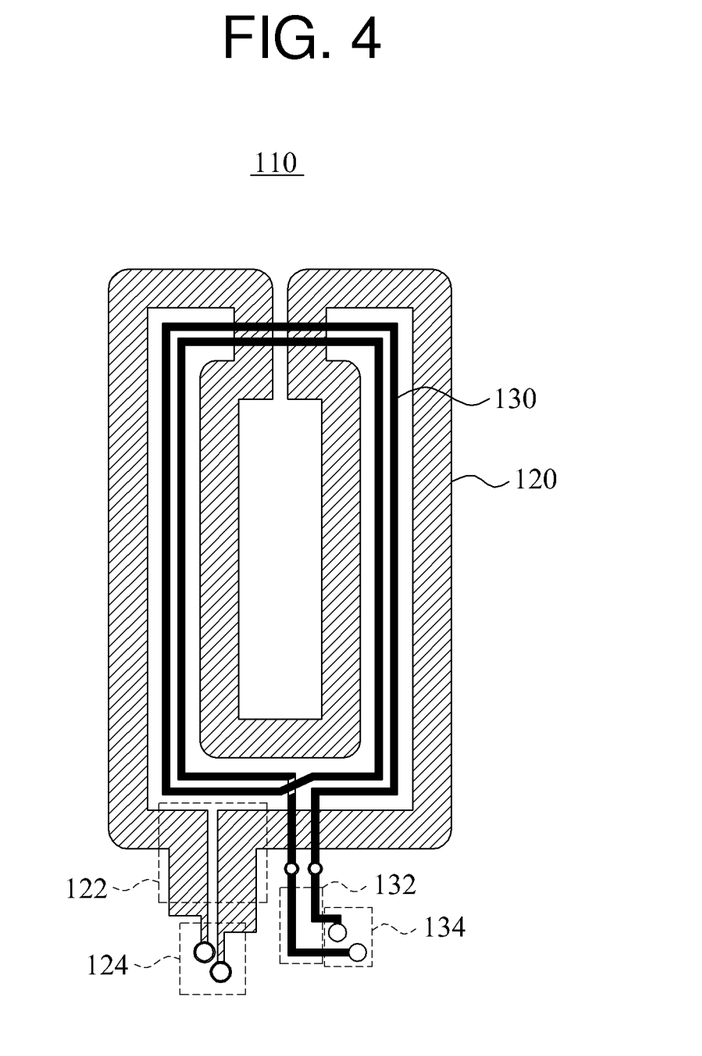
FIG. 4 is a diagram illustrating another example of the dual antenna of FIG. 1.

FIG. 4 is a diagram illustrating another example of the dual antenna 110 of FIG. 1. In comparison to the example of FIG. 2, positions of the first antenna 120 and the second antenna 130 of the example of FIG. 4 are exchanged.

In more detail, the first antenna 120 is a dual loop antenna. The second antenna 130 is a dual loop antenna. The first antenna 120 is disposed at an inside and an outside of the second antenna 130. In more detail, the first antenna 120 encompasses the second antenna 130. A portion of the first antenna 120 is disposed at an outside of a region in which the second antenna 130 is disposed. Another portion of the first antenna 120 is disposed at an inside of the region in which the first antenna 120 is disposed. The dual loop antenna structure of the first antenna 120 may enable the first antenna 120 to have high isolation characteristics with respect to the second antenna 130.

The first antenna 120 may have a circular shape or a polygonal shape. The first antenna 120 may have a shape of a partially cut circle or a partially cut polygon, rather than a complete circle or a complete polygon. In the example of FIG. 4, the first antenna 120 has a rectangular shape with rounded corners. A lower end of the first antenna 120 is partially cut.

A portion of the second antenna 130 passes over or under (i.e., overlaps or is overlapped by) the first antenna 120 disposed on a plane. The portion of the second antenna 130 may pass under a portion of the first antenna 120 disposed on the plane, i.e., may be overlapped by a portion of the first antenna 120 disposed on the plane. Alternatively, the portion of the second antenna 130 may pass over a portion of the first antenna 120 disposed on the plane, i.e., may overlap a portion of the first antenna 120 disposed on the plane. If the portion of the second antenna 130 passes over or under the portion of the first antenna 120 disposed on the plane, an overlapping or overlapped portion of the first antenna 120 and an overlapped or overlapping portion of the second antenna 130 may be separated from each other physically and/or electrically. More than one portion of the second antenna 130 may pass over or under the first antenna 129, i.e., may overlap or be overlapped by the first antenna 120. For example, in FIG. 4, four portions of the second antenna 130 pass over, i.e., overlap, the first antenna 120. However, one or more portions of the second antenna 130 may pass over, i.e., overlap, the first antenna 120, while one or more other portions of the second antenna 130 may pass under, i.e., be overlapped by, the first antenna 120.

For example, at the overlapped portion of the first antenna 120 and the overlapping portion of the second antenna 130, an empty space or an insulating material may be disposed between overlapped portion of the first antenna 120 and the overlapping portion of the second antenna 130. That is, the overlapped portion of the first antenna 120 and the overlapping portion of the second antenna 130 may be separated from each other physically and/or electrically by the empty space or the insulating material.

The first antenna 120 and the second antenna 130 may be disposed on different planes, respectively. In the terminal 100, the plane on which the first antenna 120 is disposed and the plane on which the second antenna 130 is disposed may be adjacent to each other.

The second antenna 130 includes an inner loop and an outer loop. The outer loop is disposed at an outside of the inner loop. A first end of the inner loop and a first end of the outer loop are connected to the second matching part 132. A second end of the inner loop and a second end of the outer loop are connected to each other.

In the dual loop antenna structure, the inner loop and the outer loop overlap each other, e.g., a portion of the outer loop overlaps a portion of the inner loop. At an overlapped portion of the inner loop and an overlapping portion of the outer loop, an empty space or an insulating material may be disposed between the overlapped portion of the inner loop and the overlapping portion of the outer loop. That is, at the overlapped portion of the inner loop and the overlapping portion of the outer loop may be separated from each other physically and/or electrically by the empty space or the insulating material.

Accordingly, through the connection between the second end of the inner loop and the second end of the outer loop, the inner loop and the outer loop form a dual loop. The dual loop enables a length of the second antenna 130 to be twice as long as a single-loop antenna. As a result, a material of the second antenna 130 may have a lower capacitance than a material of a single-loop antenna having a length half as long as the second antenna 130.

Figure 5:
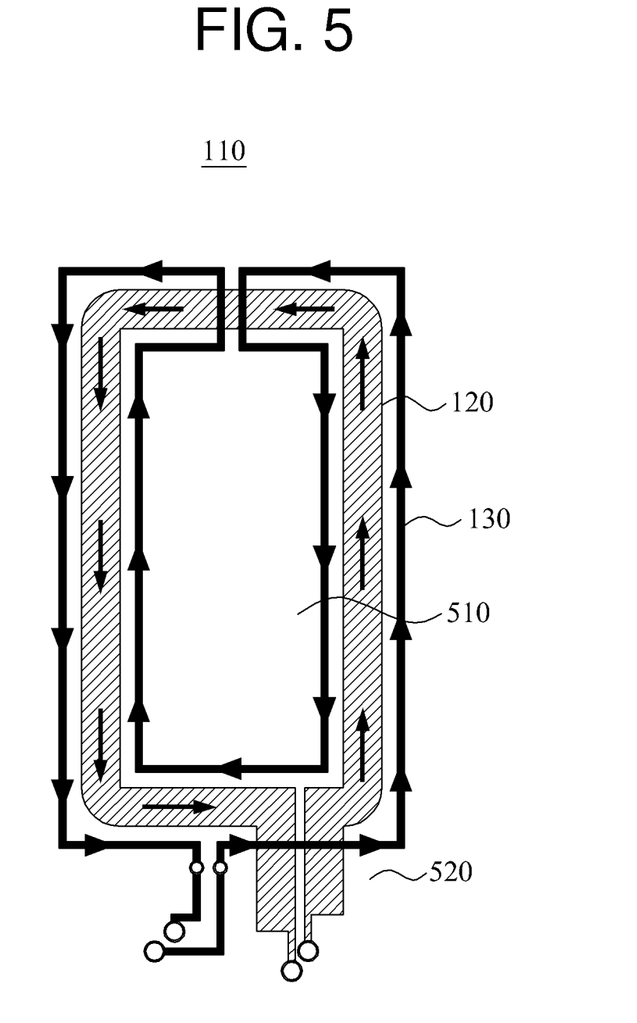
FIG. 5 is a diagram illustrating an example of a current flow of the dual antenna of FIG. 2.

FIG. 5 is a diagram illustrating an example of a current flow of the dual antenna 110 of FIG. 2. Referring to FIG. 5, arrows in the first antenna 120 denote a current flowing in the first antenna 120, and arrows in the second antenna 130 denote a current flowing in the second antenna 130.

The current flows counterclockwise in the first antenna 120. Therefore, the first antenna 120 generates a field in an inner region 510 of the dual antenna 110 inside an inner loop of the second antenna 130, and generates a field in an outer region 520 of the dual antenna 110 outside an outer loop of the second antenna 130. A direction of the field generated by the first antenna 120 in the inner region 510 is opposite to a direction of the field generated by the first antenna 120 in the outer region 520. The field may be an electric field, a magnetic field, or an electromagnetic field.

The first antenna 120 also generates a field between the loop of the first antenna 120 and the inner loop of the second antenna 130, and generates a field between the loop of the first antenna 120 and the outer loop of the second antenna 130. A direction of the field generated by the first antenna 120 between the loop of the first antenna 120 and the inner loop of the second antenna 130 is opposite to a direction of the field generated by the first antenna 120 between the loop of the first antenna 120 and the outer loop of the second antenna 130.

In the inner loop of the second antenna 130, the current flows clockwise. In the outer loop of the second antenna 130, the current flows counterclockwise. Since directions of these currents are opposite, a direction of a field generated by the current flowing in the inner loop and a direction of a field generated by the current flowing in the outer loop are opposite to each other in the inner region 510 and the outer region 520, and are the same between the inner loop and the outer loop. Therefore, the fields generated by the inner loop and the outer loop offset each other in the inner region 510 and the outer region 520, and augment each other between the inner loop and the outer loop. An offset of fields may be an offset of magnetic field components of the fields, and an augmentation of fields may be an augmentation of magnetic field components of the fields.

The strength of a magnetic field generated by a current depends on a distance from the current. Therefore, in the inner region 510, the magnetic field generated by the inner loop is stronger than the magnetic field generated by the outer loop of the second antenna 130, so that in the inner region 510, the magnetic field generated by the inner loop is only partially offset by the magnetic field generated by the outer loop, and some of the magnetic field generated by the inner loop remains in the inner region 510. Also, in the outer region 520, the magnetic field generated by the outer loop is stronger than the magnetic field generated by the inner loop, so that in the outer region 520, the magnetic field generated by the outer loop is only partially offset by the magnetic field generated by the inner loop, and therefore some of the magnetic field generated by the outer loop remains in the outer region 520.

Although the fields generated by the inner loop and the outer loop of the second antenna 130 augment each other between the inner loop and the outer loop, the resulting augmented field has a negligible effect on a current flowing in the first antenna 120 because the inner loop and the outer loop of the second antenna 130 are close to the first antenna 120.

The field generated by the loop of the first antenna 120 will be called a first field. The resulting field generated by the inner loop and the outer loop of the second antenna 130 will be called a second field. A direction of the first field is opposite to a direction of the second field, so the first field and the second field offset each other. Consequently, the first antenna 120 and the second antenna 130 may have high isolation characteristics with respect to each other.

A single shielding material may be used on a plane on which the first antenna 120 and the second antenna 130 are formed. For example, if the plane is a PCB or a case of the terminal 100, the first antenna 120 and the second antenna 130 may be formed on the PCB or the case, and the shielding material may cover the first antenna 120 and the second antenna 130. Since the single shielding material is applied to both the first antenna 120 and the second antenna 130, a production efficiency may be increased while a cost is reduced. Also, the single shielding material may enable a thickness of the dual antenna 110 and the terminal 100 to be reduced.

A current flowing in the first antenna 120 may not induce a current in the second antenna 130 because any current induced in the inner loop of the second antenna 130 may be counteracted by any current induced in the outer loop of the second antenna 130 due to the way the inner loop and the outer loop are connected.

Figure 6:
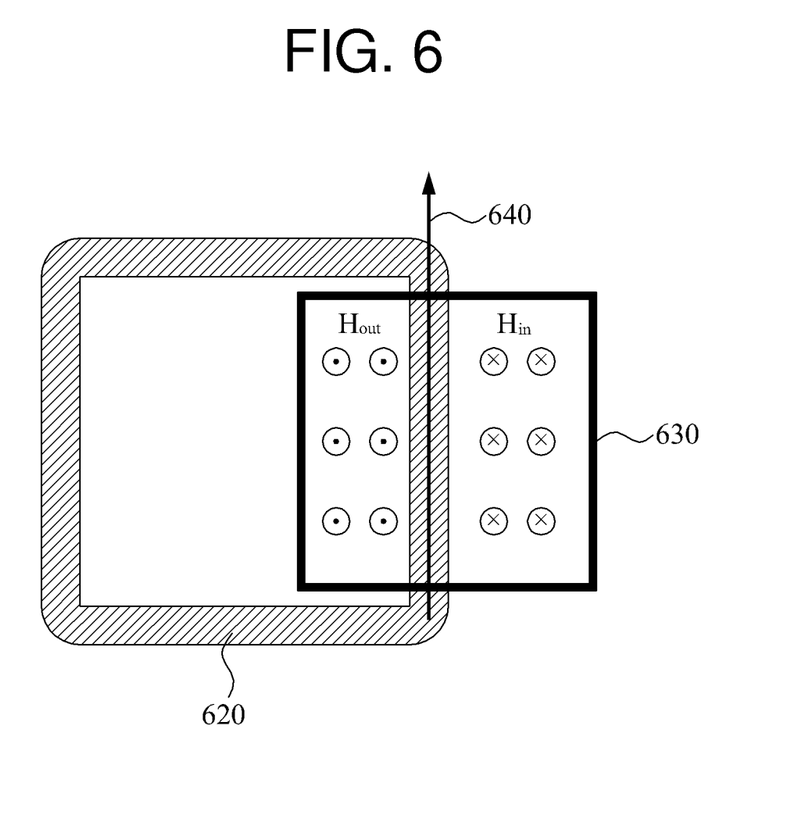
FIG. 6 is a diagram illustrating an example of an induced current flowing in an antenna.

FIG. 6 is a diagram illustrating an example of an induced current flowing in an antenna. Referring to FIG. 6, a first antenna 620 may correspond to the first antenna 120 described with reference to FIG. 1. A second antenna 630 may correspond to the second antenna 130 described with reference to FIG. 1.

A flux that induces a current in the first antenna 620 or the second antenna 630 may be expressed by the following Equation 1:

$$\Phi = \mu \int_S \overline{H}_{in} \cdot d\overline{S} + \mu \int_S \overline{H}_{out} \cdot d\overline{S} \quad (1)$$

In Equation 1, $\Phi$ may denote a flux that induces a current in the first antenna 620 due to a field generated by the second antenna 630, or a flux that induces a current in the second antenna 630 due to a field generated by the first antenna 620. The direction of the induced current may be determined according to the right-hand grip rule. Additionally, $\mu$ denotes a constant to convert the generated field into the flux.

Also, in Equation 1, S denotes a surface through which the generated field passes. $d\overline{S}$ denotes an infinitesimal element of the surface S. $d\overline{S}$ may denote a physical, mathematical, or conceptual infinitesimal element of S.

Further, in Equation 1, $\overline{H}_{in}$ denotes an inward field. $\overline{H}_{in}$ may denote an inward magnetic field. $\overline{H}_{in}$ denotes a field directed into the plane on which the first antenna 620 and the second antenna 630 are disposed. $\overline{H}_{out}$ denotes an outward field. $\overline{H}_{out}$ may denote an outward magnetic field. $\overline{H}_{out}$ denotes a field directed out of the plane on which the first antenna 620 and the second antenna 630 are disposed. The fields denoted by $\overline{H}_{in}$ and are directed in opposite directions with respect to each other.

FIG. 6 also shows the inward field $\overline{H}_{in}$ and the outward field $\overline{H}_{out}$. In FIG. 6, ⊗ denotes the inward field $\overline{H}_{in}$, and ⊙ denotes the outward field $\overline{H}_{out}$ $\overline{H}_{out}$. In addition, an arrow 640 denotes a direction of the induced current flowing in the first antenna 620 due to the fields $\overline{H}_{in}$ and $\overline{H}_{out}$.

Since the directions of the fields $\overline{H}_{in}$ and $\overline{H}_{out}$ are opposite to each other, when an absolute value of a surface integral of $\overline{H}_{in}$ according to Equation 1 and an absolute value of a surface integral of $\overline{H}_{out}$ according to Equation 1 are equal or similar to each other, each of a mutual flux value and a coupling value between the first antenna 620 and the second antenna 630 may be 0 or approximately 0. According to the mutual flux value and the coupling value of 0 or approximately 0, the first antenna 120 and the second antenna 130 may have high isolation characteristics with respect to each other.

As described above, the first antenna 620 may correspond to the first antenna 120 described with reference to FIG. 1, and the second antenna 630 may correspond to the second antenna 130 described with reference to FIG. 1.

The first antenna 120 and the second antenna 130 may be designed, generated, formed, arranged, or manufactured in the dual antenna 110 or the terminal 100 so that the induced current generated in the first antenna 120 due to the field generated by the second antenna 130 is minimized; or so that the induced current generated in the second antenna 130 due to the field generated by the first antenna 120 is minimized; or so that the induced current generated in the first antenna 120 due to the field generated by the second antenna 130 is less than or equal to a predetermined threshold value; or so that the induced current generated in the second antenna 130 due to the field generated by the first antenna 120 is less than or equal to a predetermined threshold value; or so that a first induced current generated in the first antenna 120 and a second induced current generated in the second antenna 130, which are generated due to the field generated by the first antenna 120 and the field generated by the second antenna 130, are minimized; or so that a first induced current generated in the first antenna 120 and a second induced current generated in the second antenna 130, which are generated due to the field generated by the first antenna 120 and the field generated by the second antenna 130, are less than or equal to a predetermined threshold value.

For example, a distance between the first antenna 120 and the second antenna 130 may be controlled so that the current may be minimized, or may be less than or equal to the predetermined threshold value. In another example, areas of the first antenna 120 and the second antenna 130 may be controlled so that the current may be minimized, or may be less than or equal to the predetermined threshold value. That is, in designing, generating, forming, arranging, and/or manufacturing the first antenna 120 and the second antenna 130, the distance between the first antenna 120 and the second antenna 130, and/or the areas of the first antenna 120 and the second antenna 130, may be taken into consideration.

Figure 7:
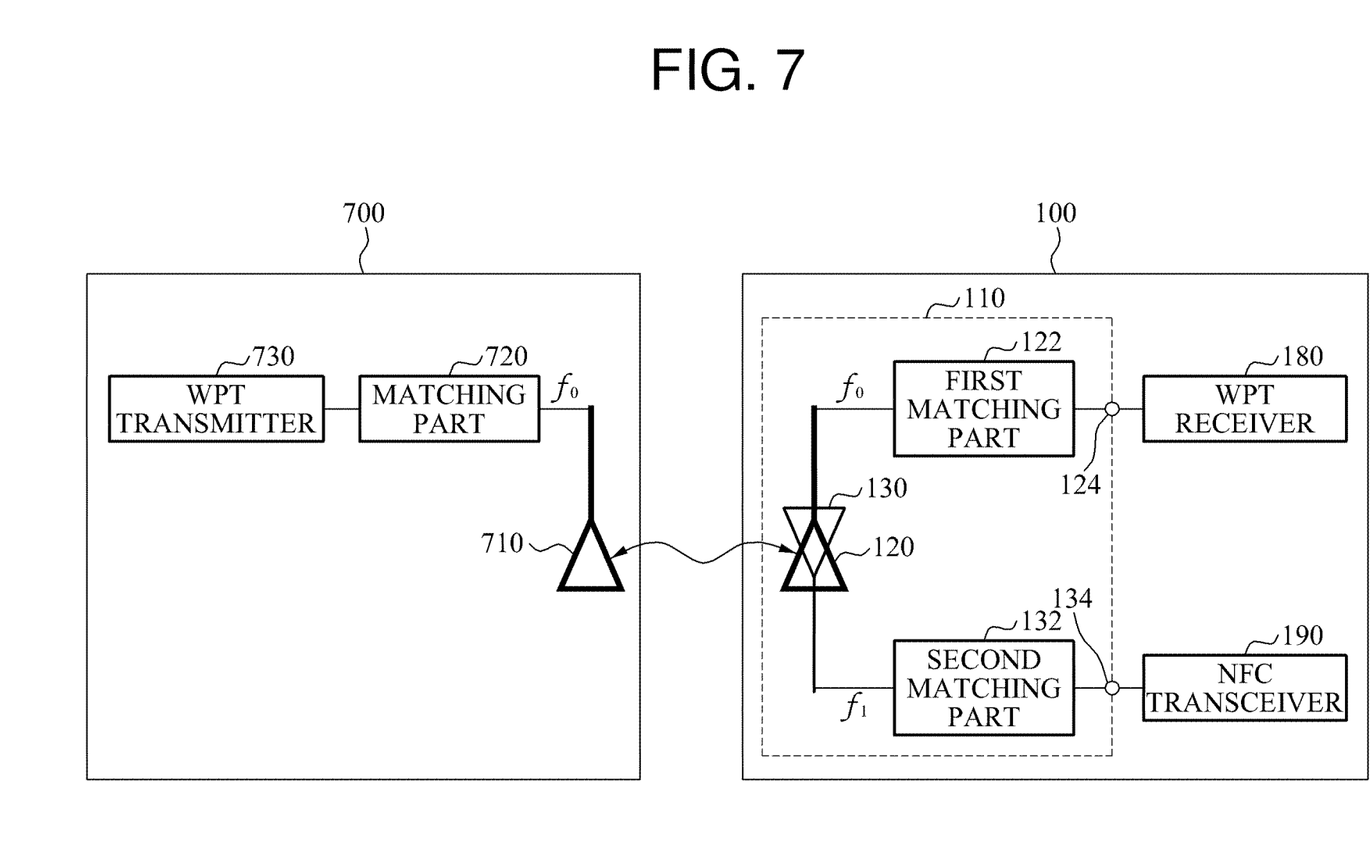
FIG. 7 is a diagram illustrating an example of a wireless power transmission (WPT) function of the terminal of FIG. 1.

FIG. 7 is a diagram illustrating an example of a WPT function of the terminal 100 of FIG. 1. A WPT transmitting terminal 700 is shown in FIG. 7. The WPT transmitting terminal 700 includes an antenna 710, a matching part 720, and a WPT transmitter 730.

To perform WPT, the antenna 710 may use a frequency $f_0$. For high efficiency WPT at the frequency $f_0$, the antenna 710 may have a high Q value at the frequency $f_0$.

The matching part 720 is an impedance matching part. The matching part 720 performs impedance matching between the antenna 710 and the WPT transmitter 730. In more detail, the matching part 720 performs matching between an output impedance of the WPT transmitter 730 and an input impedance of the antenna 710.

The WPT transmitter 730 outputs a signal for the WPT. The antenna 710 receives the signal from the WPT transmitter 730 via the matching part 720, and transmits the signal to the terminal 100.

The first antenna 120 of the terminal 100 receives the signal transmitted from the antenna 710. That is, the WPT between the antenna 710 and the first antenna 120 is performed. The WPT transmitting terminal 700 and the terminal 100 may be located within a predetermined distance from each other that enables the WPT.

As described above, the dual antenna 110 may have high isolation characteristics. Therefore, even when a high level of wireless power is transmitted to the first antenna 120, power or signals received by the second antenna 130 for the NFC due to interference from the first antenna 120 may be weak. That is, interference at the second antenna 130 from the first antenna 120 may be prevented due to the high isolation characteristics of the dual antenna 110. The interference may include an electrical interference, a magnetic interference, and/or an electromagnetic interference.

Figure 8:
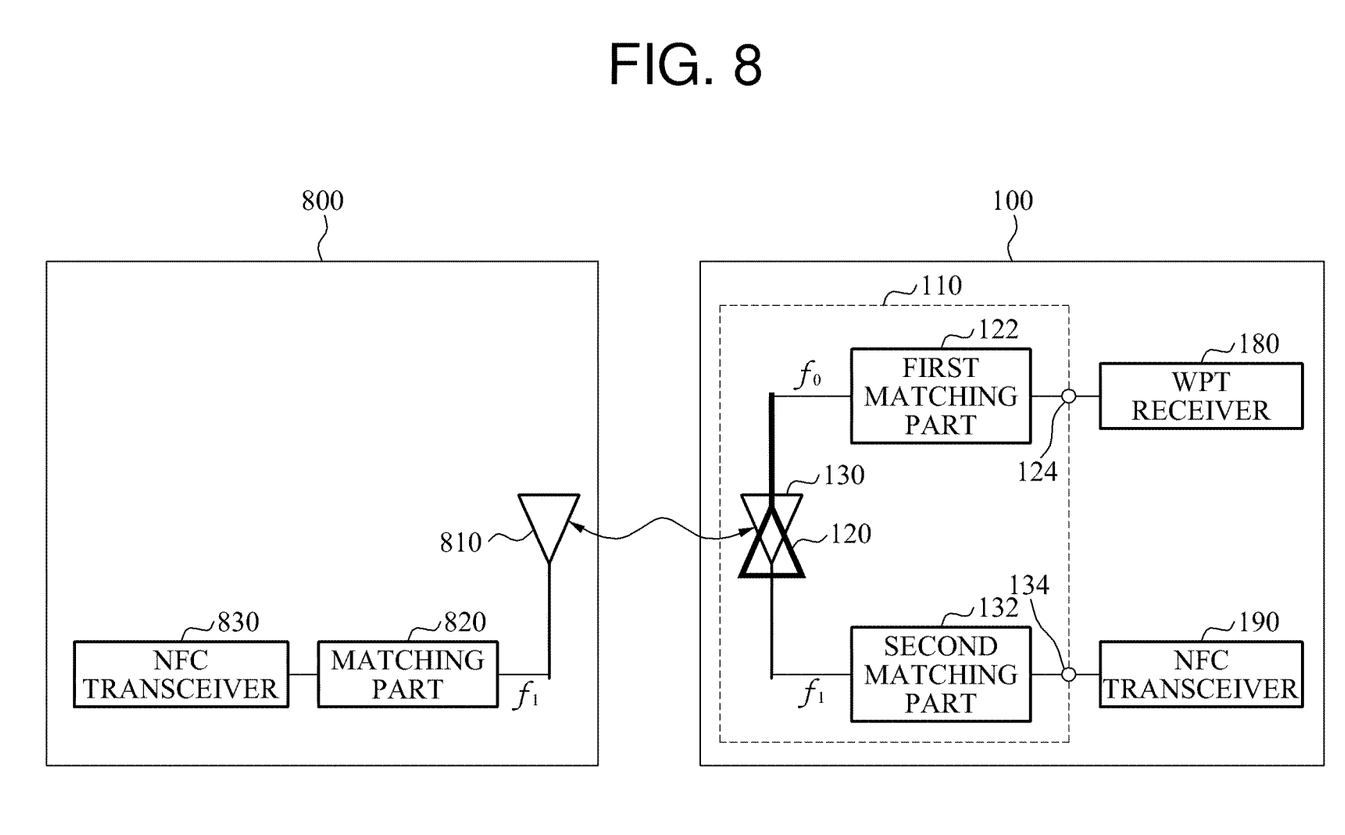
FIG. 8 is a diagram illustrating an example of a near field communication (NFC) function of the terminal of FIG. 1.

FIG. 8 is a diagram illustrating an example of an NFC function of the terminal 100 of FIG. 1. An NFC terminal 800 is shown in FIG. 8. The NFC terminal 800 includes an antenna 810, a matching part 820, and an NFC transceiver 830.

To perform NFC, the antenna 810 may use a frequency $f_1$. For efficient NFC at the frequency $f_1$, the antenna 810 may have a low Q value at the frequency $f_1$.

The matching part 820 is an impedance matching part. The matching part 820 performs impedance matching between the antenna 810 and the NFC transceiver 830. The matching part 820 performs matching between an output impedance of the NFC transceiver 830 and an input impedance of the antenna 810.

The NFC transceiver 830 outputs a signal for the NFC, and receives a signal for the NFC. The antenna 810 receives the signal outputted from the NFC transceiver 830 via the matching part 820, and transmits the received signal to the terminal 100. The antenna 810 further receives a signal transmitted from the terminal 100, and inputs the received signal to the NFC transceiver 830 via the matching part 820.

The second antenna 130 of the terminal 100 receives the signal transmitted from the antenna 810. That is, the NFC between the antenna 810 and the second antenna 130 is performed. The NFC terminal 800 and the terminal 100 may be located within a predetermined distance from each other that enables the NFC.

As described above, the dual antenna 110 may have high isolation characteristics. Therefore, even when signals are received by the second antenna 130 or signals are transmitted from the second antenna 130, power or signals received by the first antenna 120 for the WPT due to interference from the second antenna 130 may be weak. That is, interference at the first antenna 120 from the second antenna 130 may be prevented due to the high isolation characteristics of the dual antenna 110. The interference may include an electrical interference, a magnetic interference, and/or an electromagnetic interference.

The various units, elements, and methods described above may be implemented using one or more hardware components, one or more software components, or a combination of one or more hardware components and one or more software components.

A hardware component may be, for example, a physical device that physically performs one or more operations, but is not limited thereto. Examples of hardware components include microphones, amplifiers, low-pass filters, high-pass filters, band-pass filters, analog-to-digital converters, digital-to-analog converters, and processing devices.

A software component may be implemented, for example, by a processing device controlled by software or instructions to perform one or more operations, but is not limited thereto. A computer, controller, or other control device may cause the processing device to run the software or execute the instructions. One software component may be implemented by one processing device, or two or more software components may be implemented by one processing device, or one software component may be implemented by two or more processing devices, or two or more software components may be implemented by two or more processing devices.

A processing device may be implemented using one or more general-purpose or special-purpose computers, such as, for example, a processor, a controller and an arithmetic logic unit, a digital signal processor, a microcomputer, a field-programmable array, a programmable logic unit, a microprocessor, or any other device capable of running software or executing instructions. The processing device may run an operating system (OS), and may run one or more software applications that operate under the OS. The processing device may access, store, manipulate, process, and create data when running the software or executing the instructions. For simplicity, the singular term "processing device" may be used in the description, but one of ordinary skill in the art will appreciate that a processing device may include multiple processing elements and multiple types of processing elements. For example, a processing device may include one or more processors, or one or more processors and one or more controllers. In addition, different processing configurations are possible, such as parallel processors or multi-core processors.

A processing device configured to implement a software component to perform an operation A may include a processor programmed to run software or execute instructions to control the processor to perform operation A. In addition, a processing device configured to implement a software component to perform an operation A, an operation B, and an operation C may include various configurations, such as, for example, a processor configured to implement a software component to perform operations A, B, and C; a first processor configured to implement a software component to perform operation A, and a second processor configured to implement a software component to perform operations B and C; a first processor configured to implement a software component to perform operations A and B, and a second processor configured to implement a software component to perform operation C; a first processor configured to implement a software component to perform operation A, a second processor configured to implement a software component to perform operation B, and a third processor configured to implement a software component to perform operation C; a first processor configured to implement a software component to perform operations A, B, and C, and a second processor configured to implement a software component to perform operations A, B, and C, or any other configuration of one or more processors each implementing one or more of operations A, B, and C. Although these examples refer to three operations A, B, C, the number of operations that may implemented is not limited to three, but may be any number of operations required to achieve a desired result or perform a desired task.

Software or instructions that control a processing device to implement a software component may include a computer program, a piece of code, an instruction, or some combination thereof, that independently or collectively instructs or configures the processing device to perform one or more desired operations. The software or instructions may include machine code that may be directly executed by the processing device, such as machine code produced by a compiler, and/or higher-level code that may be executed by the processing device using an interpreter. The software or instructions and any associated data, data files, and data structures may be embodied permanently or temporarily in any type of machine, component, physical or virtual equipment, computer storage medium or device, or a propagated signal wave capable of providing instructions or data to or being interpreted by the processing device. The software or instructions and any associated data, data files, and data structures also may be distributed over network-coupled computer systems so that the software or instructions and any associated data, data files, and data structures are stored and executed in a distributed fashion.

For example, the software or instructions and any associated data, data files, and data structures may be recorded, stored, or fixed in one or more non-transitory computer-readable storage media. A non-transitory computer-readable storage medium may be any data storage device that is capable of storing the software or instructions and any associated data, data files, and data structures so that they can be read by a computer system or processing device. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, or any other non-transitory computer-readable storage medium known to one of ordinary skill in the art.

Functional programs, codes, and code segments that implement the examples disclosed herein can be easily constructed by a programmer skilled in the art to which the examples pertain based on the drawings and their corresponding descriptions as provided herein.

As a non-exhaustive illustration only, a terminal described herein may be a mobile device, such as a cellular phone, a personal digital assistant (PDA), a digital camera, a portable game console, an MP3 player, a portable/personal multimedia player (PMP), a handheld e-book, a portable laptop PC, a global positioning system (GPS) navigation device, a tablet, a sensor, or a stationary device, such as a desktop PC, a high-definition television (HDTV), a DVD player, a Blue-ray player, a set-top box, a home appliance, or any other device known to one of ordinary skill in the art that is capable of wireless communication and/or network communication.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A dual antenna comprising:
   a loop antenna; and
   a dual loop antenna comprising a single antenna with two loops, the two loops comprise a first loop and a second loop surrounding the first loop, the first loop disposed at an inside of the loop antenna and the second loop disposed at an outside of the loop antenna,
   wherein the loop antenna and the dual loop antenna are separate and distinct antennas.

2. The dual antenna of claim 1, wherein the loop antenna is configured to perform wireless power transmission; and
   the dual loop antenna is configured to perform near field communication.

3. The dual antenna of claim 1, wherein the loop antenna is configured to generate a first field; and
   the dual loop antenna is configured to generate a second field offsetting the first field.

4. The dual antenna of claim 1, wherein the loop antenna and the dual loop antenna are configured so that an induced current generated in the dual loop antenna by a field generated by the loop antenna is less than or equal to a threshold value.

5. A dual antenna comprising:
   a loop antenna; and
   a dual loop antenna disposed at an inside and an outside of the loop antenna,
   wherein the dual loop antenna comprises:
      an inner portion disposed at the inside of the loop antenna;
      a first outer portion disposed at the outside of the loop antenna;
      a second outer portion disposed at the outside of the loop antenna;
      a first connecting portion connecting a first end of the inner portion to an end of the first outer portion; and
      a second connecting portion connecting a second end of the inner portion to an end of the second outer portion.

6. The dual antenna of claim 5, wherein the first connecting portion overlaps the loop antenna disposed on a plane; and
   the second connecting portion overlaps the loop antenna.

7. A dual antenna comprising:
   a first antenna comprising a circle or polygon shape that is partially cut; and
   a second antenna comprising a single antenna with two loops, the two loops comprise a first loop and a second loop surrounding the first loop, the first loop disposed at an inside of the first antenna and the second loop disposed at an inside and an outside of the first antenna.

8. The dual antenna of claim 7, wherein the first antenna and the second antenna are disposed on a plane.

9. The dual antenna of claim 7, wherein the first antenna is for performing wireless power transmission using a first frequency; and
the second antenna is for performing near field communication using a second frequency.

10. The dual antenna of claim 7, wherein the first antenna has a high Q value; and
the second antenna has a low Q value.

11. The dual antenna of claim 7, wherein:
the first antenna is configured to generate a first field; and
the second antenna is configured to generate a second field offsetting the first field.

12. The dual antenna of claim 7, wherein the first antenna and the second antenna are configured so that an induced current generated in the second antenna by a field generated by the first antenna is less than or equal to a threshold value.

13. A dual antenna comprising:
a first antenna comprising a circle or polygon shape that is partially cut; and
a second antenna disposed at an inside and an outside of the first antenna,
wherein the second antenna comprises:
an inner portion disposed at the inside of the first antenna;
a first outer portion disposed at the outside of the first antenna;
a second outer portion disposed at the outside of the first antenna;
a first connecting portion connecting a first end of the inner portion to an end of the first outer portion; and
a second connecting portion connecting a second end of the inner portion to an end of the second outer portion.

14. The dual antenna of claim 13, wherein the first connecting portion overlaps the first antenna disposed on a plane; and
the second connecting portion overlaps the first antenna.

15. The dual antenna of claim 14, wherein the first connecting portion and the first antenna are insulated from each other; and
the second connecting portion and the first antenna are insulated from each other.

16. A dual antenna comprising:
a first antenna configured to generate a first field; and
a second antenna configured to generate a second field offsetting the first field,
wherein the second antenna comprises a single antenna with two loops, the two loops comprise a first loop and a second loop surrounding the first loop, the first loop disposed at an inside of the first antenna and the second loop disposed at an outside of the first antenna.

17. The dual antenna of claim 16, wherein the first antenna is for performing wireless power transmission; and
the second antenna is for performing near field communication.

* * * * *